Sept. 30, 1924.  
J. F. JOHNSON  
1,510,146  
BLADE FASTENING MEANS  
Filed June 3, 1921
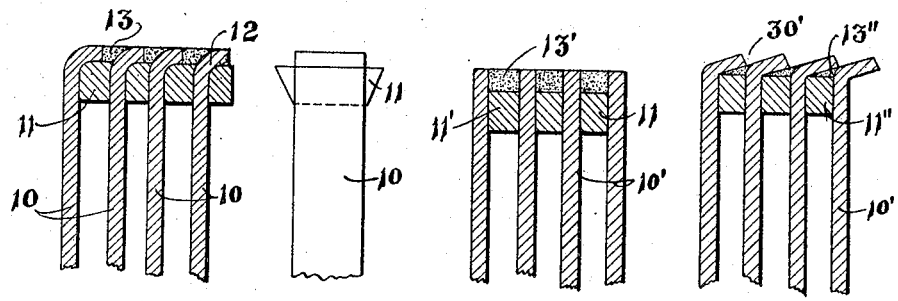
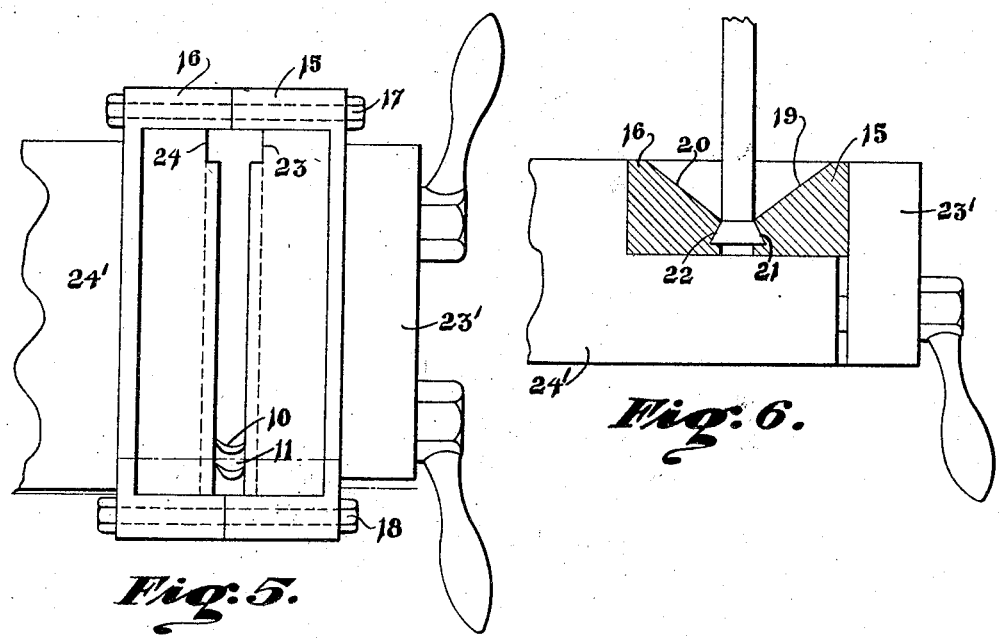
J. F. Johnson  
INVENTOR
BY  
D. C. Davis  
ATTORNEY Patented Sept. 30, 1924.

1,510,146

UNITED STATES PATENT OFFICE.

JOSIAH F. JOHNSON, OF SWARTHMORE, PENNSYLVANIA, ASSIGNOR TO WESTINGHOUSE ELECTRIC AND MANUFACTURING COMPANY, A CORPORATION OF PENNSYLVANIA.

BLADE-FASTENING MEANS.

Application filed June 3, 1921. Serial No. 474,826.

*To all whom it may concern:*

Be it known that I, JOSIAH F. JOHNSON, a citizen of the United States, and a resident of Swarthmore, in the county of Delaware and State of Pennsylvania, have invented a new and useful Improvement in Blade-Fastening Means, of which the following is a specification.

My invention relates to a method of and apparatus for the pre-assembly of turbine blades prior to their insertion in the turbine, and it has for its object to provide a method and apparatus of the character designated which shall permit the pre-assembly and integral uniting of a plurality of turbine blades after which they may be inserted in groups into the turbine structures, where they will be held in a rigid manner, the entire operation constituting a simple, inexpensive and rapid method of blading turbines.

Referring to the accompanying drawing, Figure 1 is a side view, in section, of a plurality of blades pre-assembled according to one form of my invention and ready for insertion in a turbine; Figure 2 is an end view of the structure shown in Figure 1; Figures 3 and 4 are views similar to Figure 1 and illustrating modified forms of blade root; Figure 5 is a plan view of a split jig or holding structure adapted for the assembly of the blades shown in Figures 1 to 4 inclusive; and Figure 6 is an end view, partially in section, of the jig shown in Figure 5.

In the blading of turbines, as practiced hitherto, it has been the usual practice to provide an undercut holding slot on the turbine structure, either stator or rotor, and to then insert the blades into said slot one by one. This has been an exceedingly slow process, inasmuch as but a limited number of workmen can operate at one time on a given turbine member and, furthermore, the method of attachment or holding of the blade root in the slot has necessarily been modified to permit this method of assembly and it has been necessary, in certain instances, to sacrifice strength and reliability in the blade fastening in order to facilitate easy and rapid assembly.

In accordance with the present invention, a group of blades is mounted in a suitable jig in appropriate spaced and substantially parallel relationship and these blades are then integrally united as by brazing, welding, or otherwise, and the completed blade groups are then mounted bodily in the turbine structure. By this method and means it is possible for a large number of workmen to be employed simultaneously in assembling individual blades and the resulting blade groups may be inserted in the turbine with great rapidity, materially lessening the time required for this latter operation. Futhermore, the blades may be largely assembled while the turbine structure, itself, is undergoing machining, rather than having to wait until the machining operations of the turbine structure are completed before starting the blading, as is the present practice. In this way a material saving in the time required for blading a given turbine is effected and, futhermore, the blades by their integral attachment to the blade holding means are much more firmly held than has been usual in the past.

Referring to the drawing for a more detailed understanding of my invention, I show a plurality of blades in longitudinal cross-section at 10, 10 in Figure 1, these blades being of any desired form and being shown as blading of the ordinary Parsons or reaction type. Between each pair of adjacent blades there is inserted a holding member or wedge 11, shown more clearly in Figure 2, this wedge being so shaped as to lock within an under-cut slot in the turbine structure, as is well known and understood in the art. Each blade 10 is bent over to provide a toe, as shown at 12, so as to engage beneath an adjacent wedge 11 and all the blades 10, 10 and the wedges 11 are integrally united as by a mass of spelter 13 suitably applied thereto.

Referring to Figure 5 a jig is shown suitable for the assembly of a blade group, as shown in Figure 1. Two complemental members 15 and 16 are firmly united as by bolts 17 and 18 and each member is scarfed or cut away on its inner-upper edge, as shown at 19 and 20, the lower portion of the contacting faces being so shaped as to form a holding slot, as shown at 21 and 22, similar to the holding slot in a turbine. The members 15 and 16 are cut away at one end of the slot, as shown at 23, 24 so as to permit the insertion of members into the slot and their subsequent sliding therein.

Having thus described the arrangement of the jig used in a blade assembly, the method of forming blade groups is as follows: The jig is firmly united by drawing up the bolts 17 and 18 and the entire device is mounted in a vise 23', 24', so as to prevent the distortion thereof. The blades 10 and the intervening spacing wedges, or members 11, are then inserted one by one in the slot 21, 22, the members 11 being inserted at the point 23, 24 and slid along the slot. The members are tightly assembled as by the use of a hammer and driving tin until the slot 21, 22 is nearly filled. The blades and spacing members are then firmly held in this position as by the insertion of a wedge in the space 23, 24 and the entire jig, together with its blades, is then removed from the vise and turned over and the blade ends or roots are bent over their adjacent spacing members 11, as shown at 12 in Figure 1 or, if desired, the blades may be previously bent and assembled in the bent positions. The entire jig, together with its blades may now be prepared for brazing as by being placed in an oven, or otherwise, and spelter 13 is then applied to firmly unite all the blades and their intervening spacing members and form an integral structure, as shown in Figure 1.

The jig 15 and 16 may, of course, be used repeatedly, merely being opened up as by loosening the bolts 17 and 18 for the removal of the blade group, when it is readily and quickly reassembled for the formation of a new blade group.

Not only is the assembly of the turbine greatly facilitated, in that the blade groups or given turbine may be made up simultaneously by a large number of workmen and at any time, either before or after the completion of the machining on the turbine elements, but also the mounting of the individual blades is accomplished at all times on an open bench at a convenient height so as to be done in a uniform manner and with great ease, as contrasted with the extremely awkward and inaccessible position in which it is frequently necessary to carry out the blading operation where the blades are mounted individually in the turbine structure.

The blade groups carrying, for example, 12 individual blades may be formed in a straight line as indicated, after which they may be bent to shape, convenient for insertion in the turbine stator or for insertion in the turbine rotor or, if desired, the jig members 15 and 16 may be so shaped that the slot 21, 22 is slightly arcuate in shape so that the blades groups may be inserted in the appropriate turbine-holding slots without bending.

Referring to the form of my invention shown in Figure 3, the blades 10' do not have their roots bent over but merely extend somewhat past the holding member 11' and the entire structure is then united by a mass of spelter 13'.

In the form of my invention shown in Figure 4, the blade members 10'' extend to some distance past the holding members 11'' so that when they are bent over, the root of each blade overlaps the root of the adjacent blade to a considerable extent, as shown at 30', after which a mass of spelter 13'' is applied, firmly uniting the different contacting blade roots together, as well as all the blades into an integral body.

While I have shown my invention in but three forms, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

What I claim is:

1. A blading unit for insertion in a turbine comprising a plurality of individual blades assembled in substantially parallel relationship, each blade being bent laterally at its foot, and means for integrally uniting said blades.

2. In a blading unit for insertion in a holding slot of a turbine, a plurality of individual blades assembled in substantially parallel relationship, a holding member between each blade and adapted to engage said slot, each blade having a lateral extension beneath an adjacent holding member, and means for integrally uniting said blades and holding means.

In testimony whereof, I have hereunto subscribed my name this 27th day of May, 1921.

JOSIAH F. JOHNSON.